US007280013B2

(12) United States Patent
Lewis

(10) Patent No.: US 7,280,013 B2
(45) Date of Patent: Oct. 9, 2007

(54) SELF-CONTAINED BREAKER RESET SYSTEM AND METHOD

(75) Inventor: Blain Lewis, Jonesborough, TN (US)

(73) Assignee: TDH Solutions, LLC, Limestone, TN (US)

( * ) Notice: Subject to any disclaimer, the term of this patent is extended or adjusted under 35 U.S.C. 154(b) by 191 days.

(21) Appl. No.: 10/882,373

(22) Filed: Jul. 1, 2004

(65) Prior Publication Data

US 2005/0001700 A1 Jan. 6, 2005

Related U.S. Application Data

(60) Provisional application No. 60/484,936, filed on Jul. 3, 2003.

(51) Int. Cl.
*H01H 73/00* (2006.01)
*H02H 3/00* (2006.01)

(52) U.S. Cl. ............................ 335/6; 335/17; 335/185; 335/186; 361/115

(58) Field of Classification Search .................... 335/6, 335/14, 17, 185, 186; 361/115
See application file for complete search history.

(56) References Cited

U.S. PATENT DOCUMENTS 5,821,876 A * 10/1998 Farrington et al. .......... 340/3.2
6,295,190 B1 * 9/2001 Rinaldi et al. .............. 361/115
6,522,227 B1 * 2/2003 Mody et al. .................. 335/14
6,577,963 B1 6/2003 Cordray et al.
6,734,768 B2 * 5/2004 Kim .............................. 335/6

* cited by examiner

*Primary Examiner*—Ramon M. Barrera
(74) *Attorney, Agent, or Firm*—Carta DeLuca Farrell & Schmidt, LLP

(57) ABSTRACT

A system and method for resetting a tripped circuit breaker are provided. The system includes a monitoring mechanism for monitoring a state of at least one electrical circuit breaker and for generating at least one monitoring signal indicative of the state of the at least one electrical circuit breaker; an actuating mechanism for actuating the at least one electrical circuit breaker in a plurality of positions; and a controller for receiving the at least one monitoring signal and for generating and transmitting at least one control signal to the actuating mechanism for resetting the at least one circuit breaker. The breaker reset system is self-contained and dimensioned as an add-on component to previously installed circuit breaker enclosure or as an integrated component of a circuit breaker enclosure. Additionally, the system allows for manual over-ride of the reset function.

19 Claims, 3 Drawing Sheets

Breaker in RESET (DN) Position

Breaker in SET (UP) Position

SELF-CONTAINED BREAKER RESET SYSTEM AND METHOD

PRIORITY

The present application is a U.S. patent application claiming priority from U.S. Provisional Application No. 60/484,936 entitled "BREAKER RESET SYSTEM" filed in the United States Patent and Trademark Office on Jul. 3, 2003, the contents of which are hereby incorporated by reference.

BACKGROUND OF THE INVENTION

1. Field of the Invention

The present invention relates generally to systems and methods for resetting electrical breakers, and more particularly, to systems and methods for resetting electrical breakers without user intervention.

2. Description of the Prior Art

Electrical wiring found in homes and industry typically includes multiple circuits each protected by a circuit breaker. The circuit breaker's primary function is to provide protection against fire or electrocution resulting from a short or other wiring problem in the circuit. Additionally, circuit breakers provide a means for temporarily removing power from a circuit so that it may be safely worked on by an electrician or technician.

Circuit breakers may trip for any of a number of reasons, ranging from excessive load, e.g., too many appliances in operation at the same time, to dangerous electrical problems such as a short circuit. Usually, simply resetting the breaker is all that is required when the fault is caused by appliance load or random power spikes. However, faults caused by electrical wiring problems need to have the cause diagnosed and corrected before resetting the breaker.

Generally, circuit breakers are positioned in out-of-the-way and sometimes not easily accessible areas of homes and commercial buildings, thus, when a circuit breaker trips due to a wiring problem or needs to be opened so that an electrician can safely work on the circuit, it can be a time consuming task to locate the circuit breaker and manually place the breaker into the desired operational mode (e.g., open or closed) for lockout/tagout.

One application where an automatic breaker reset solution is most useful is in the Railroad Signal Industry. In this industry, the electrical equipment, e.g., lights, signals, movable barricades, etc., are often place in remote locations; often quite distant from one another and from any monitoring station. Circuit breaker boxes are generally scattered throughout the rail network and thus for minor circuit trips it would be highly inconvenient to require technicians to manually reset the tripped breaker. Therefore, an automatic breaker reset system would increase convenience, and reduce costs and equipment downtime by requiring technicians to respond only to severe or reoccurring circuit trips.

Automatic breaker reset systems are commercially available, however these systems can only be used with specially designed circuit breakers and are generally quite costly to install. Such systems are not feasible for installation in homes or as an add-on to an existing circuit breaker system.

SUMMARY OF THE INVENTION

A breaker reset system and method thereof are provided, which detect a tripped circuit breaker and subsequently perform a reset procedure on the circuit breaker without user intervention.

An embodiment of the present disclosure provides a breaker reset system for detecting a tripped circuit breaker and subsequently resetting the circuit breaker. The breaker reset system includes a controller, e.g., a programmable logic controller (PLC), for executing instructions for detecting and resetting a tripped circuit breaker. Additionally, a line voltage control relay and a load voltage control relay are provided, which are positioned, respectively, on the line-side and load-side of the circuit breaker and in electrical communication with the controller. The control relays are configured for monitoring the voltages on their respective sides of the circuit breaker and relaying voltage status to the controller.

The system analyzes the voltage status and determines if the circuit breaker has tripped. If a trip has resulted, the controller controls an actuator assembly having a motor and screw assembly. The actuator assembly is in mechanical communication with the circuit breaker's handle. The actuator assembly is configured to actuate the handle to a RESET position followed by actuating the handle to a SET position and finally returning said handle to a default position. A plurality of position sensors provides positioning information of the actuator assembly to the controller.

An aspect of the present disclosure provides for a breaker reset system, which provides monitoring of a breaker's operational status, and reset of a tripped breaker, while still allowing the breaker to be opened when desired, for example, during lockout/tagout.

An additional aspect of the present disclosure provides for an automated breaker reset system, which is controllable and programmable remotely.

A further aspect of the present disclosure provides for an automated breaker reset system, which is adapted to be installable onto standard, commercially available circuit breakers.

BRIEF DESCRIPTION OF THE DRAWINGS

These and other features, aspects, and advantages of the present disclosure will become better understood with regard to the following description, appended claims, and accompanying drawings wherein:

DESCRIPTION OF THE PREFERRED EMBODIMENTS

Figure 1:
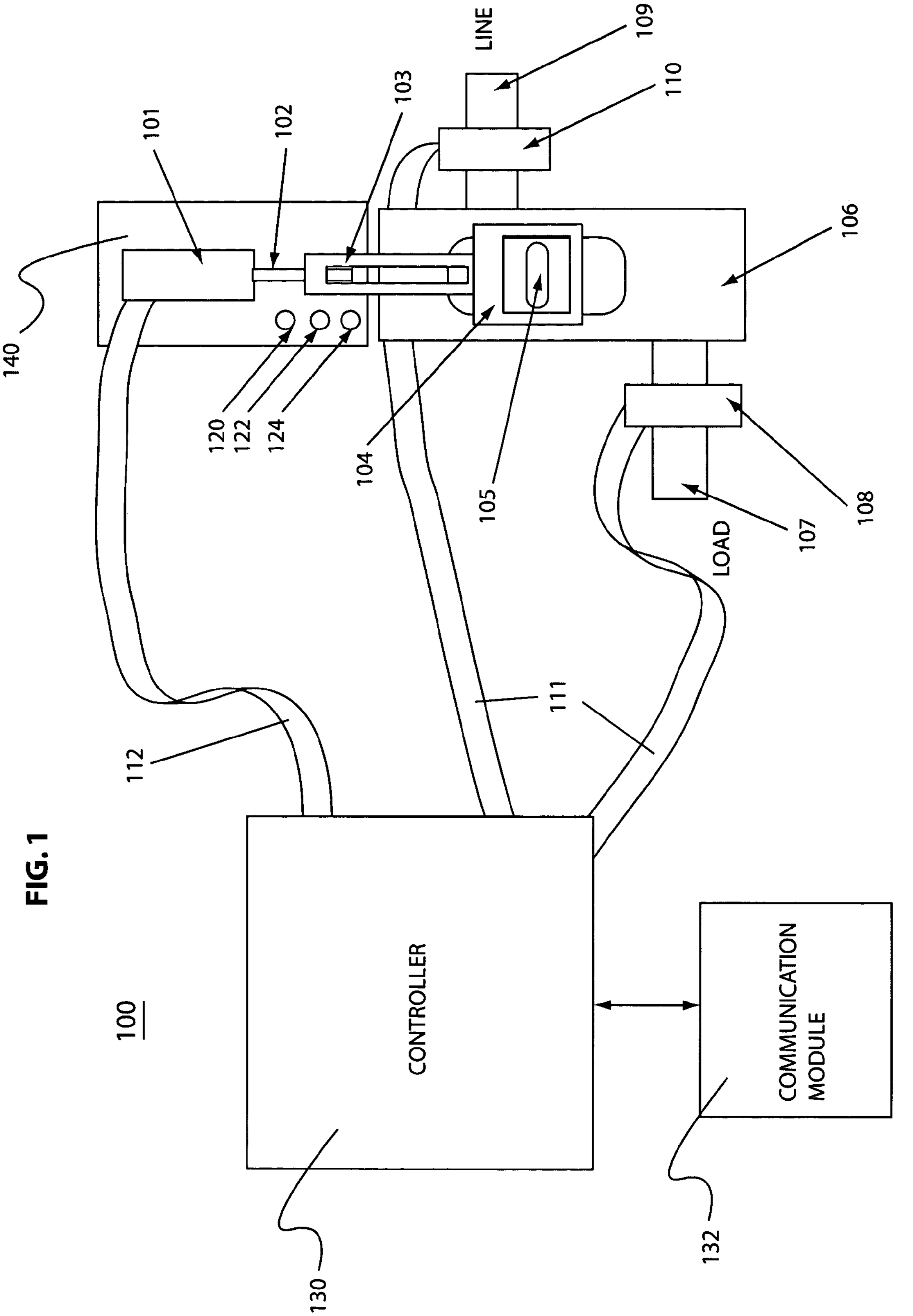
FIG. 1 is a schematic view of an embodiment of a self-contained breaker reset system in accordance with the present disclosure.

With reference to FIG. 1, there is shown a schematic view of a breaker reset system 100 according to the present disclosure. The various components of the system 100 are identified in FIG. 1. Generally, the system 100 includes a monitoring mechanism, e.g., relays 108 and 110, for monitoring an electrical property of a load cable 107 and a line cable 109, respectively, a resetting mechanism 140 for resetting the circuit breaker 106 after a trip has been detected, and a controller 130 for receiving and interpreting the electrical property information from the monitoring relays 108 and 110 and controlling the resetting mechanism 140 based on the electrical property information via a control signal.

The resetting mechanism 140 includes a linear drive motor 101 coupled to an interface block 104 for actuating a lever 105 of the circuit breaker 106 to reset the breaker. The linear drive motor 101 is capable of operating in two modes, a forward and a reverse mode. In the forward mode, a screw axle 102 is rotated in a clockwise direction; and in the reverse mode, the screw axle 102 is rotated in a counter-clockwise direction. The screw axle 102 is joined to an actuator assembly 103 for driving the removable interface block 104. The interface block 104 is dimensioned to surround the lever 105 of the circuit breaker 106. The removability of the interface block 104 allows for user-override of the system 100 so that a particular circuit breaker can be manually tripped or prevented from being tripped, for example, during lockout/tagout.

The resetting mechanism 140, additionally, includes several position sensors 120, 122 and 124. The position sensors 120, 122 and 124 detect the position of the actuator assembly 103, e.g., default 122, RESET 124 or SET 120, and relays the position data to the controller 130, preferably, a Programmable Logic Controller (PLC). The position sensors may include a pressure switch, a magnet and contact, an LED and photodetector, etc. The controller 130 also receives voltage status data via cabling 111 from a line-voltage control relay 110 positioned to monitor the voltage present on the incoming (e.g., line-side) electrical cable 109 and a load-voltage control relay 108 positioned to monitor the voltage present on the outgoing (e.g., load-side) electrical cable 107.

The controller 130 is programmed with executable instructions, which utilize the status data received to determine if the circuit breaker 106 has been tripped. Upon failure of the circuit breaker, the load-voltage will drop significantly and load-current will approach zero-amps. This causes monitoring relay 108 to de-energize. When conditions are such that monitoring relay 110 (line-voltage) is energized and monitoring relay 108 (load-voltage) is de-energized, the controller 130 will confirm a tripped circuit breaker condition. These conditions will cause the system 100 to respond by initiating a Reset Cycle as will be described below in relation to FIG. 2–4.

Once the controller 130 determines that a trip fault has occurred, the controller 130 issues commands via control cabling 112 directing the linear drive motor 101 to move the actuator assembly first to a RESET position (see FIG. 2), then to a SET position (see FIG. 3) and finally to the lever's 105 default position, as will be described in detail below. The position sensors 120, 122 and 124 provide feedback to the controller 130, indicating whether the actuator assembly 103 has moved to the directed position. Once the controller 130 receives feedback from the position sensors 120, 122 and 124 indicating successful actuator assembly 103 movement to the directed position, the controller 130 issues the next command directing the actuator assembly 103 to move to the next position, and so on until the circuit breaker has been properly reset.

While most faults occur due to transient power spikes and require simply resetting the tripped circuit breaker 106, some faults, however, are caused by damaged or faulty wiring. Faults caused by damaged or faulty wiring will cause the circuit breaker 106 to repeatedly trip. In such a situation, the controller 130 is programmed to track repeated faults and upon reaching a threshold number of faults in a predetermined period of time, the controller 130 will cease attempts to reset the circuit breaker 106. The controller 130 may be further configured to issue a notification alerting a technician of a possibly serious wiring problem if the threshold number of faults has been exceeded. The notification may take the form of an indicator light, an alarm or both.

Additionally, a communication module 132 may be incorporated to provide notification over a wireless data connection, e.g., IEEE 802.11/a/b/g, Bluetooth, or mobile telephony (GSM, CDMA, etc.), or a hard-wired connection. Wireless notification over mobile phone systems is especially useful in cases where the breaker reset system 100 is installed at a remote, off-site location as may occur when the breaker reset system is used in railroad applications.

Ideally, the breaker reset system 100, is powered by the voltage of the line-side cable 109. However, an additional uninterruptible backup power source may be present for situations where power is lost from the line-side (e.g., blackout, etc.). Such a backup power source can be a battery that is rechargeable from the line-side voltage or it may be an electric generator disposed for providing power to the system during power loss. Additionally, solar energy may be used for recharging the battery.

Figure 4:
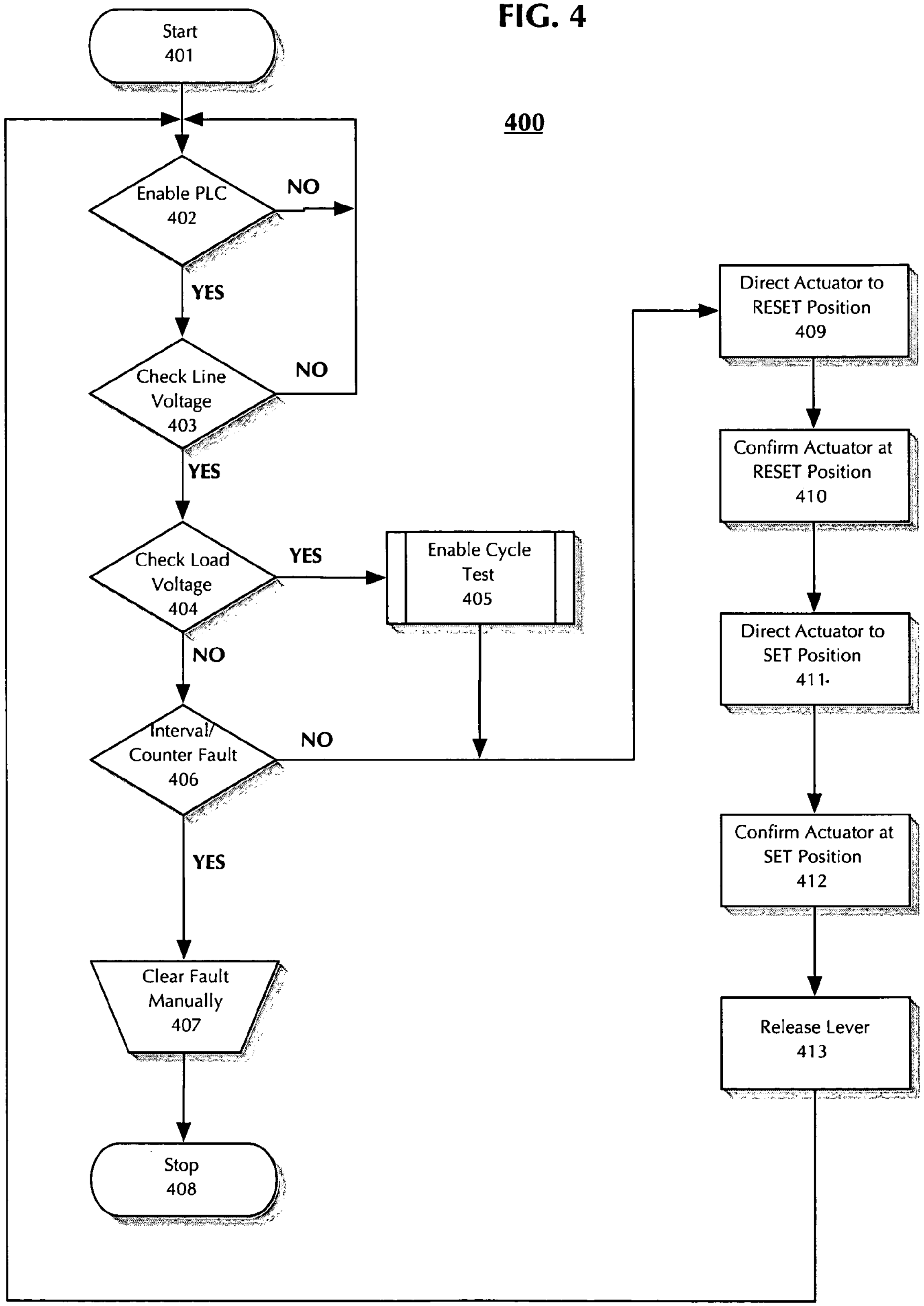
FIG. 4 is a flowchart of the steps executed by an embodiment of the present disclosure.

FIG. 4 illustrates a flow chart of a preferred method of operating the breaker reset system 100 of the present disclosure. At step 401, the breaker reset system 100 begins operation, initializing the controller 130. The status of the controller 130 is checked in step 402. Step 402 is performed until the controller 130 is enabled and operational at which point, the PLC 130 proceeds to step 403 and checks for line voltage via relay 110, followed by a check for load voltage via relay 108 in step 404. If line voltage is not detected then the process returns to step 402 and continues as previously described. If load voltage is not detected, step 406 is initiated, wherein the system is evaluated to determine if a fault has occurred, e.g., if a predetermined number of trips have occurred within a predetermined period of time. In the event of a fault, the method proceeds to step 407 and pauses until an operator clears the fault manually. If a fault is not diagnosed, the method continues to step 409 to reset the tripped breaker as described below.

In the event that both monitoring relays 108, 110 become de-energized, the system 100 will determine that a major power failure has occurred and that a reset cycle is not necessary. In event of a major power failure during a reset cycle, the system 100 will wait for line-power to return before attempting any further cycle actions.

If both line and load voltages are detected in steps 403 and 404, the method allows a user to selectively perform step 405, where a cycle test, e.g., diagnostic test, is performed. The cycle test performs the steps 409 to 413 as if an actual trip of the circuit breaker 106 had been detected. Step 405 may also be performed automatically as part of system initialization or a periodic system check.

Figure 2:
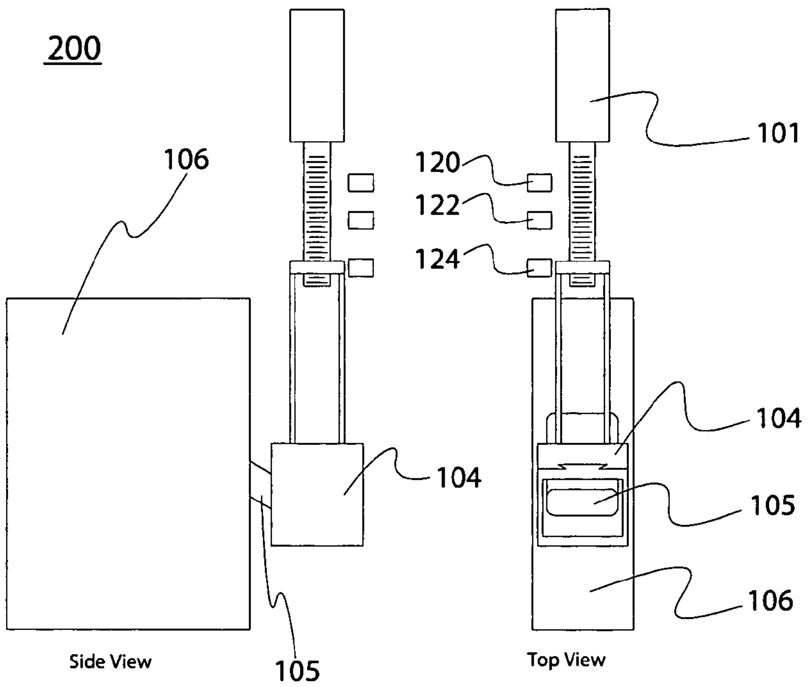
FIG. 2 is a schematic view of the embodiment of FIG. 1 in the RESET position configuration.
Figure 3:
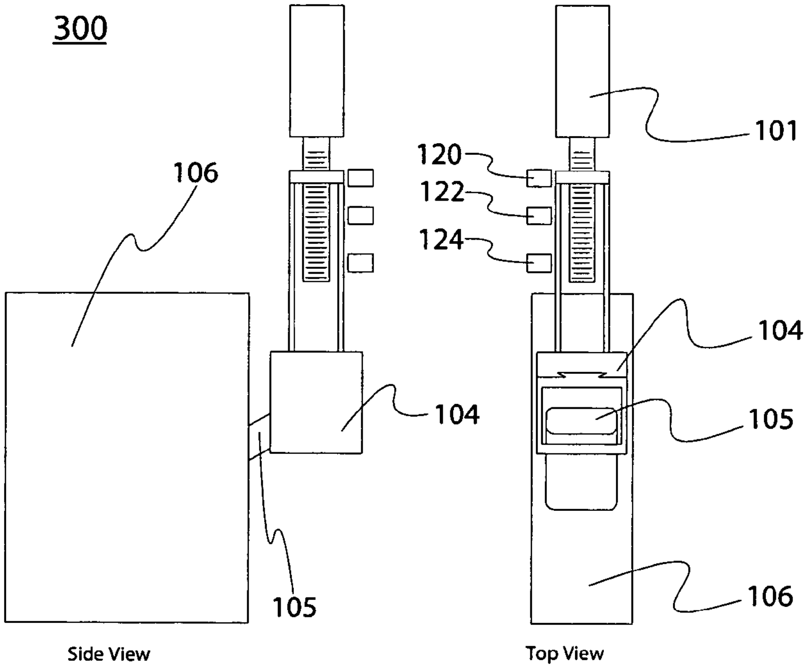
FIG. 3 is a schematic view of an embodiment of FIG. 1 in the SET position configuration.

Proceeding on to step 409, when it is detected that the circuit breaker 106 has tripped, e.g. line voltage is detected but load voltage is not as in step 404, the controller 130 directs the resetting mechanism 140 to drive the actuator assembly 103, moving the circuit breaker lever 105 to the RESET position (see FIG. 2). In step 410, the actuator assembly 103 is confirmed to be in the RESET position via position sensor 124. In step 411, the controller 130 energizes the actuator assembly 103 once again, moving the circuit breaker lever 105 to the SET position (see FIG. 3). In step 412, the actuator assembly 103 is confirmed to be in the SET position via position sensor 120. Finally, in step 413, the actuator assembly 103 is allowed to return to a default position.

A system and method for resetting an electrical circuit breaker has been described. It is to be appreciated that the system and method may be employed with individual or double circuit breakers. Furthermore, since the system does not require a specially-configured circuit breaker, the system may easily be retrofitted into existing circuit breaker enclosure and may be integrated into the enclosure cover or door.

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

What is claimed is:

1. A breaker reset system for detecting a tripped circuit breaker and subsequently resetting said circuit breaker, said breaker reset system comprising:

a controller for executing instructions configured for detecting and resetting said tripped circuit breaker;

a line voltage control relay positioned on a line-side of said circuit breaker and in electrical communication with said controller, said line voltage control relay configured for monitoring line-side voltage entering said circuit breaker;

a load voltage control relay positioned on a load-side of said circuit breaker and in electrical communication with said controller, said load voltage control relay configured for monitoring said load-side voltage exiting said circuit breaker; and an actuator assembly, controlled by said controller, positioned and dimensioned to reset said circuit breaker by actuating said circuit breaker's handle to a RESET position followed by actuating said handle to a SET position.

2. The breaker reset system of claim 1, further comprising a plurality of position sensors in electrical communication with said controller, said position sensors are configured and positioned to provide positioning information of said actuator assembly to said controller.

3. The breaker reset system of claim 1, wherein said actuator assembly further comprises a motor and screw assembly controlled by said controller and configured to move said actuator assembly.

4. The breaker reset system of claim 1, wherein said breaker reset system is an installable component of a breaker enclosure.

5. The breaker reset system of claim 1, wherein said breaker reset system is an integrated component of and housed within a breaker enclosure.

6. The breaker rest system of claim 5, wherein said breaker enclosure contains a plurality of integrated breaker reset systems.

7. The breaker reset system of claim 1, wherein said breaker reset system is configurable for lockout/tagout operation, such that said breaker reset system can be disengaged from said circuit breaker handle.

8. The breaker reset system of claim 1, further comprises a means for recording operational data of said circuit breaker.

9. The breaker reset system of claim 8, wherein said operational data consists of one or more parameters selected from a group consisting of: circuit breaker status, line voltage value or load voltage value.

10. A breaker reset method for detecting a tripped circuit breaker and subsequently resetting said circuit breaker, said breaker reset method comprising the steps of:

monitoring a line-side voltage entering said circuit breaker;

monitoring a load-side voltage exiting said circuit breaker;

detecting the occurrence of a tripping of said circuit breaker, wherein said detection is based on voltage data from said monitored line-side and load-side voltages; and resetting said tripped circuit breaker, when a trip is detected, by actuating said circuit breaker's handle to a RESET position followed by actuating said handle to a SET position.

11. The breaker reset method of claim 10, wherein said reset method is performed by an actuator assembly comprises a motor and screw assembly controlled by a programmable logic controller (PLC) and configured to move said actuator assembly.

12. The breaker reset method of claim 10, further comprising the step of confirming said circuit breaker's handle is in the RESET position.

13. The breaker reset method of claim 10, further comprising the step of confirming said circuit breaker's handle is in the SET position.

14. The breaker reset method of claim 10, further comprising the step of providing a means for selectively overriding the resetting step.

15. The breaker reset method of claim 10, further comprises the step of recording operational data of said circuit breaker.

16. The breaker reset method of claim 15, wherein said operational data consists of one or more parameters selected from a group consisting of: circuit breaker status, line voltage value or load voltage value.

17. The breaker reset method of claim 10, further comprising the steps of:

counting a number of trips of said circuit breaker; and if the number of trips exceeds a predetermined limit within a predetermined period of time, stopping attempts to reset said circuit breaker.

18. A system for resetting at least one electrical circuit breaker, the system comprising:

a monitoring mechanism for monitoring a state of the at least one electrical circuit breaker by monitoring line-side and load-side voltages of the at least one electrical circuit breaker, said monitoring mechanism generating at least one monitoring signal indicative of the state of the at least one electrical circuit breaker;

an actuating mechanism for actuating the at least one electrical circuit breaker in a plurality of positions;

a controller for receiving the at least one monitoring signal and for generating and transmitting at least one control signal to the actuating mechanism for resetting the at least one circuit breaker; and at least one position sensor for determining a position of the actuating mechanism.

19. The system of claim 18, further comprising a communication module for communicating the state of the at least one electrical circuit breaker to a user.

* * * * *